(12) United States Patent
Krymski

(10) Patent No.: US 7,375,748 B2
(45) Date of Patent: May 20, 2008

(54) DIFFERENTIAL READOUT FROM PIXELS IN CMOS SENSOR

(75) Inventor: Alexander Krymski, La Crescenta, CA (US)

(73) Assignee: Micron Technology, Inc., Boise, ID (US)

( * ) Notice: Subject to any disclaimer, the term of this patent is extended or adjusted under 35 U.S.C. 154(b) by 934 days.

(21) Appl. No.: 10/230,222

(22) Filed: Aug. 29, 2002

(65) Prior Publication Data

US 2004/0051802 A1 Mar. 18, 2004

(51) Int. Cl.
*H04N 5/217* (2006.01)

(52) U.S. Cl. .............. 348/241; 348/300; 348/322; 250/208.1

(58) Field of Classification Search ......... 348/241, 348/243, 244, 245, 294, 300, 301, 302, 308, 348/322; 250/208.1, 208.2

See application file for complete search history.

(56) References Cited

U.S. PATENT DOCUMENTS

| | | | | |
|---|---|---|---|---|
| 5,434,619 | A * | 7/1995 | Yonemoto | 348/241 |
| 5,471,515 | A * | 11/1995 | Fossum et al. | 377/60 |
| 5,521,639 | A * | 5/1996 | Tomura et al. | 348/243 |
| 5,739,562 | A * | 4/1998 | Ackland et al. | 257/291 |
| 5,841,126 | A * | 11/1998 | Fossum et al. | 250/208.1 |
| 6,101,287 | A * | 8/2000 | Corum et al. | 382/274 |
| 6,140,630 | A | 10/2000 | Rhodes | |
| 6,204,524 | B1 | 3/2001 | Rhodes | |
| 6,222,175 | B1 * | 4/2001 | Krymski | 250/208.1 |
| 6,344,877 | B1 * | 2/2002 | Gowda et al. | 348/245 |
| 6,423,994 | B1 | 7/2002 | Guidash | |
| 6,438,276 | B1 * | 8/2002 | Dhuse et al. | 382/312 |
| 6,476,864 | B1 * | 11/2002 | Borg et al. | 348/245 |
| 6,614,473 | B1 * | 9/2003 | Kijima | 348/243 |
| 6,747,699 | B2 * | 6/2004 | Ohzu et al. | 348/294 |
| 6,795,117 | B2 * | 9/2004 | Tay | 348/241 |
| 6,914,627 | B1 * | 7/2005 | Dong | 348/248 |
| 6,982,757 | B2 * | 1/2006 | Tariki | 348/243 |
| 2003/0223003 | A1 * | 12/2003 | Meynants | 348/294 |
| 2004/0041080 | A1 | 3/2004 | Barna et al. | |

OTHER PUBLICATIONS

Iliana L. Fujimori, et al., "A 256×256 CMOS Differential Passive Pixel Imager with FPN Reduction Techniques"; 2000 IEEE International Solid State Circuits Conference, Feb. 7, 2000, pp. 106-107.
Brent Keeth, et al., "DRAM Circuit Design; A Tutorial"; IEEE Solid-State Circuits Society, Chapter 3, pp. 69-103, Nov. 2000.

* cited by examiner

*Primary Examiner*—Lin Ye
*Assistant Examiner*—Chriss S Yoder, III
(74) *Attorney, Agent, or Firm*—Dickstein Shapiro LLP

(57) ABSTRACT

The present invention provides an improved pixel readout circuit that compensates for common mode noise during a read out operation. This is accomplished by using a differential readout of the signal and reset value from the desired pixel compared with the reset value from a reference pixel. In this manner common mode noise can be offset and therefore minimized. In one embodiment of the invention, the reference pixel is the nearest neighbor pixel in the same row. In another embodiment, the reference pixel is the nearest neighboring pixel in a different row.

59 Claims, 12 Drawing Sheets

DIFFERENTIAL READOUT FROM PIXELS IN CMOS SENSOR

FIELD OF THE INVENTION

The invention relates generally to improved semiconductor imaging devices and in particular to an imaging device which can be fabricated using a standard CMOS process. Particularly, the invention relates to a CMOS imager having an array of image sensing cells and to the driving signals which operate the cells.

BACKGROUND OF THE INVENTION

There is a current interest in CMOS active pixel imagers for possible use as low cost imaging devices. An exemplary pixel circuit of a CMOS active pixel sensor (APS) is described below with reference to FIG. 1. Active pixel sensors can have one or more active transistors within the pixel unit cell, can be made compatible with CMOS technologies and promise higher readout rates compared to passive pixel sensors. The FIG. 1 exemplary pixel cell 10 is a 4T APS, where the 4T is commonly used in the art to designate use of four transistors to operate the pixel. A 4T pixel has a photodiode 162, a reset transistor 184, a transfer transistor 182, a source follower transistor 186, and a row select transistor 188. It should be understood that while FIG. 1 shows the circuitry for operation of a single pixel, and that in practical use there will be an M times N array of pixels arranged in rows and columns with the pixels of the array accessed using row and column select circuitry, as described in more detail below.

The pixel cell 150 includes the photodiode 162 which converts incident photons to electrons. The electrons are passed to a collection node A by transfer transistor 182. A source follower transistor 186 has its gate connected to node A and thus amplifies the signal appearing at Node A. When a particular row containing cell 150 is selected by a row selection transistor 188, the signal amplified by transistor 186 is passed on a column line 170 to the readout circuitry. The photodiode 162 accumulates a photo-generated charge in a doped region of the substrate. It should be understood that the CMOS imager may include a photogate or other photon to charge converting device, in lieu of a photodiode, as the initial accumulator for photo-generated charge.

The gate of transfer transistor 182 is coupled to a transfer control signal (tx) line 180, thereby serving to control the coupling of the photodiode 162 to the node A. A reset voltage source Vrst is coupled by conductive line 163 through reset transistor 184 to node A. The gate of reset transistor 184 is coupled to a reset control line rst 190 which serves to control the reset operation in which Vrst is connected to node A. The row select control line 160 is coupled to all of the pixels of the same row of the array. Voltage source Vdd is coupled to column line 170 by conductive line 165 through transistors 186 and 188. Although not shown in FIG. 1, column line 170 is coupled to all of the pixels of the same column of the array and typically has a current sink at its lower end. The gate of row select transistor 188 is coupled to row select control line 160. The Vrst power supply is typically connected to the Vdd power supply, so that the Vrst voltage is equivalent to Vdd (e.g., Vdd_pix).

As known in the art, a value is read from pixel 150 in a two step process. First, node A is reset by turning on reset transistor 184 and the reset voltage (e.g., Vrst) is read out to column line 170 by the source follower transistor 186 through the activated row select transistor 188. Second, after pixel reset, a charge integration period occurs during which the photodiode 162 converts photons to electrons. After the integration period, transfer transistor 182 turns on and the integrated charge is passed by transfer transistor from the photodiode 162 to node A, where it is amplified by source follower transistor 186 and passed to column line 170 by row access transistor 188. As a result, the two different values—the reset voltage and the signal voltage—are read-out from the pixel and sent by the column line 170 to the readout circuitry where each is sampled and held for further processing as known in the art.

All pixels in a row are read out simultaneously onto respective column lines 170 and the column lines are activated in sequence for pixel reset and signal voltage read out. The rows of pixels are read out in sequence onto the respective column lines.

FIG. 2 shows an exemplary CMOS active pixel sensor integrated circuit chip that includes an array of active pixel sensors 230 and a controller 232 which provides timing and control signals to enable reading out of signals stored in the pixels in a manner commonly known to those skilled in the art. Exemplary arrays have dimensions of M times N pixels, with the size of the array 230 depending on a particular application. The imager is read out a row at a time using a column parallel readout architecture. The controller 232 selects a particular row of pixels in the array 230 by controlling the operation of row addressing circuit 234 and row drivers 240. Charge signals stored in the selected row of pixels are provided on the column lines 170 to a readout circuit 242 in the manner described above. The pixel signal read from each of the columns then can be read out sequentially using a column addressing circuit 244. Differential pixel signals (Vrst, Vsig) corresponding to the read out reset signal and integrated charge signal are provided as respective outputs Vout1, Vout2 of the readout circuit 242.

FIG. 3 more closely shows the rows and columns 349 of CMOS active pixel sensors 350. Each column includes multiple rows of sensors 350. Signals from the active pixel sensors 350 in a particular column can be read out to a readout circuit 352 associated with that column. The read out circuit 352 includes sample and hold circuitry for acquiring the pixel reset and integrated charge signals. Signals stored in the readout circuits 352 then can be read sequentially column-by-column to an output stage 354 which is common to the entire array of pixels 330. The analog output signals can then be sent, for example, to a differential analog circuit and which subtracts the reset and integrated charge signals and sends them to an analog-to-digital converter (ADC) or the reset and integrated charge signals are each supplied to the analog-to-digital converter.

As fabrication techniques get better an increasing number of digital processing circuits are being implemented on the same chip as an image sensor. This increases substrate noise coupling to a pixel, which can compromise the signal to noise ratio of the image sensor core. The substrate noise occurs when spurious noise signals are injected locally into the substrate through ohmic or capacitive coupling, thereby breaking the equipotentiality of the substrate.

Accordingly, when the reset signal and the integrated charge signal are read out at different times, the potential of the local ground may not be the same. The sensing node A (FIG. 1) of each pixel is capacitively coupled to a local ground and is dynamically affected by local substrate noise. The common mode noise, including ground noise, during the reset phase is Vcm1 and during the signal phase is Vcm2. If Vsig is the signal voltage and Vrst is the reset voltage, then the differential voltage Vdiff=(Vsig+Vcm2)−(Vrst+Vcm1).

Since Vcm2 does not equal Vcm1, they do not cancel out in the differential signal, and instead adversely affect the pixel signal ultimately produced.

One way of dealing with substrate noise is to use a dummy circuit, similar to a pixel circuit, and located near the pixel circuit, but shielded from light as a reference signal source. Theoretically, the pixel and dummy circuit would see the same substrate voltage which can then be correlated in processing. But this will cause a decreased fill factor for the pixels, and for some architectures will cause an increase in KTC (thermal) noise.

It would be desirable to have a pixel readout circuit that compensates for substrate and other common mode noise that is encountered during a pixel read out operation.

BRIEF SUMMARY OF THE INVENTION

The present invention provides an improved pixel readout circuit and method of operation which minimizes substrate and other common mode noise during a read out operation. The circuit improves the consistency of the pixel to pixel output of the pixel array and increases the dynamic range of the pixel output. This is accomplished by obtaining a differential readout of the reset signal and integrated charge signal from a desired pixel along with a reset signal and a comparison signal from a different reference pixel, where the comparison signal is a reset signal taken in the reference pixel at the same time that the charge accumulated signal is taken in the desired pixel. Thus, a reset value is taken twice from the reference pixel; once during reset sampling phase, e.g., the reset value, and once during signal sampling phase e.g., the comparison value,. In this manner common mode noise can be minimized by a combination of signals from the desired and reference pixels. In one exemplary embodiment of the invention, the reference pixel is the nearest neighbor pixel in the same row. In another exemplary embodiment, the reference pixel is the nearest neighboring pixel in a different row of the same column.

Since any given pixel of the array serves as a desired pixel at one time and a reference pixel at another time there is no need to fabricate additional pixels to be used as reference pixels.

These and other features and advantages of the invention will be more readily understood from the following detailed description of the invention which is provided in connection with the accompanying drawings.

DETAILED DESCRIPTION OF THE INVENTION

In the following detailed description, reference is made to the accompanying drawings, which form a part hereof, and in which is shown by way of illustration specific embodiments in which the invention may be practiced. These embodiments are described in sufficient detail to enable those of ordinary skill in the art to make and use the invention, and it is to be understood that structural, logical or procedural changes may be made to the specific embodiments disclosed without departing from the spirit and scope of the present invention.

To minimize common ground noise and the loss of fill factor the present invention utilizes a neighbor pixel as the source of a reference differential signal which is combined with the output of a desired pixel. In an exemplary embodiment, the actual photosignal from the neighboring pixel is not read when the neighboring pixel acts as reference pixel, only a reference value is taken as a comparison signal from the reference pixel at the time of taking the photo signal from the desired pixel. A reset signal is also taken from the reference pixel at the time of talking the reset signal of the desired pixel. Since neighboring pixels share the same local substrate, their ground voltage is substantially identical, and any induced ground noise is also substantially the same. By subtracting the reference values of the neighboring pixel from signals taken from the desired pixel, the ground noise is cancelled out and therefore removed. The neighboring reference pixel is close to the desired pixel but need not be an adjacent pixel, though use of an adjacent pixel as the reference pixel is desirable to help ensure that the desired pixel and reference pixel experience the same substrate noise effects. Accordingly, the exemplary embodiments of the invention described herein utilize an adjacent row pixel as a reference pixel and an adjacent column pixel as a reference pixel.

Figure 4:
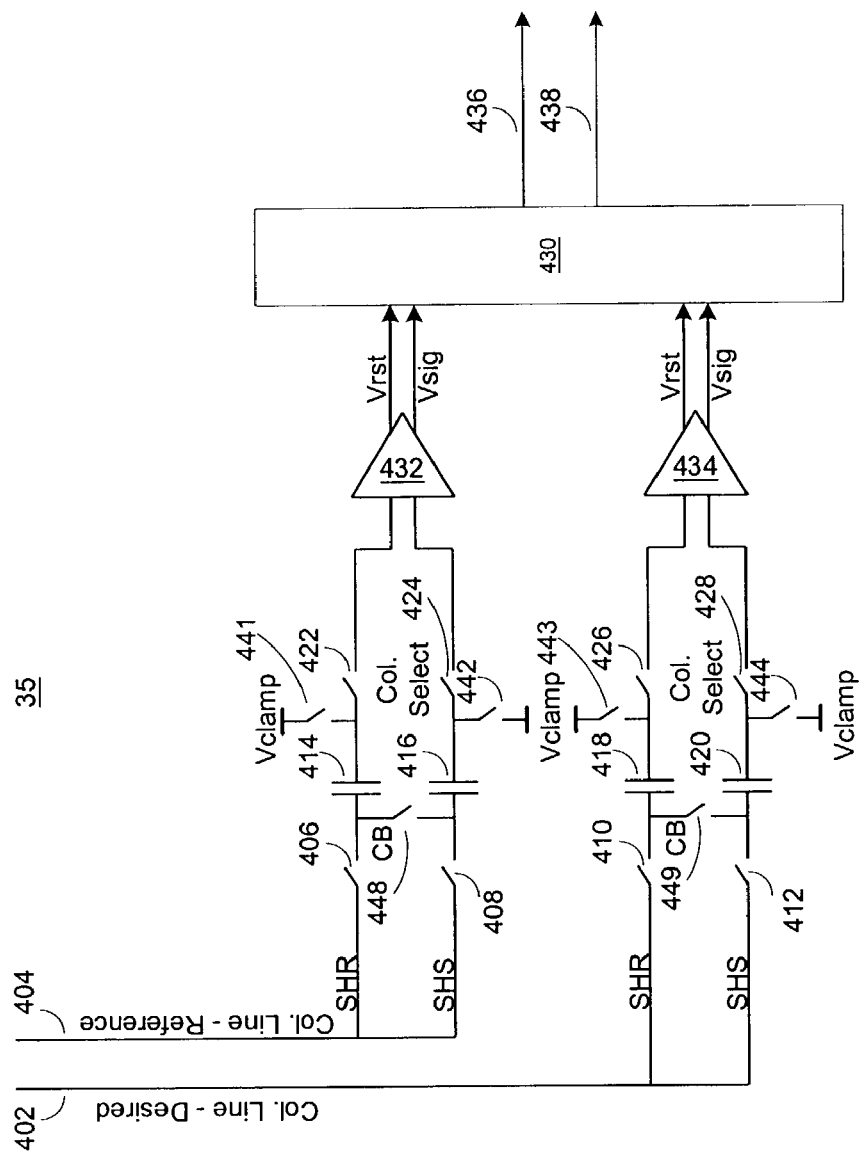
FIG. 4 is a sample and hold circuit in accordance with an exemplary embodiment of the invention.

FIG. 4 illustrates sample and hold circuit in accordance with a first exemplary embodiment of the invention which uses an adjacent row pixel as a reference. In this embodiment, the sample and hold circuit 35 is capable of sampling and holding two sets of signals simultaneously, e.g., a reset signal and a photo signal from a desired pixel and a reset signal and a comparison signal and a reference pixel in adjacent columns, and then subsequently combining the two sets of signals: For example, a reset signal of a desired pixel on column line 402 would be stored on capacitor 418 and the charge accumulated photo signal would be stored on capacitor 420. And similarly, a reset signal for a reference pixel associated with adjacent column line 404 would be stored on capacitor 414 and a comparison signal would be stored on capacitor 416. A downstream circuit subsequently combines these signals and outputs a charge accumulated signal free of noise.

The circuit 35 is precharged when a pulse Vclamp is applied to switches 441, 442, 443, and 444 thereby temporarily coupling Vclamp to the capacitors 414, 416, 418, 420 thereby placing a Vclamp charge on them. To store the charge accumulated signal of the desired pixel on capacitor 420, a pulse signal is enabled which closes the SHS switch 412 and couples the desired pixel with the capacitor 420 through the column line 402 and then the SHS switch 412 is opened, which retains the charge accumulated signal in the capacitor 420 (assuming that Col. Select switch 428 is open). Similarly, to store the reset signal of the desired pixel on capacitor 418, a pulse signal is enabled which closes the SHR switch 410 and couples the desired pixel with the capacitor 418 through the column line 402 and then the SHR switch 410 is opened, which retains the signal in the capacitor 418 (assuming that Col. Select switch 426 is open). Storing the reset and comparison signals of the reference pixel is done in an analogous manner. A pulse signal is enabled which closes the SHS switch 408 and couples the reference pixel with the capacitor 416 through the column line 404 and then the SHS switch 408 is opened, which retains the comparison signal in the capacitor 416 (assuming that Col. Select switch 424 is open). Similarly, to store the reset signal of the reference pixel on capacitor 414, a pulse signal is enabled which closes the SHR switch 406 and couples the reference pixel with the capacitor 414 through the column line 404 and then the SHR switch 406 is opened, which retains the signal in the capacitor 414 (assuming that Col. Select switch 422 is open).

In order to read out the stored reset, charge accumulated, and comparison signals of the desired and reference pixels from the capacitors 414, 416, 418, and 420 a pulse signal is enabled closing CB switches 448, 449 and Col. Select switches 422, 424, 426, and 428 and thereby coupling capacitors 414, 416 with differential amplifier 432 and capacitors 418, 420 with differential amplifier 434. Signals output from amplifiers 432 and 434 are coupled to a combining circuit 430 which combines these signals and outputs the resulting differential signals.

Figure 5:
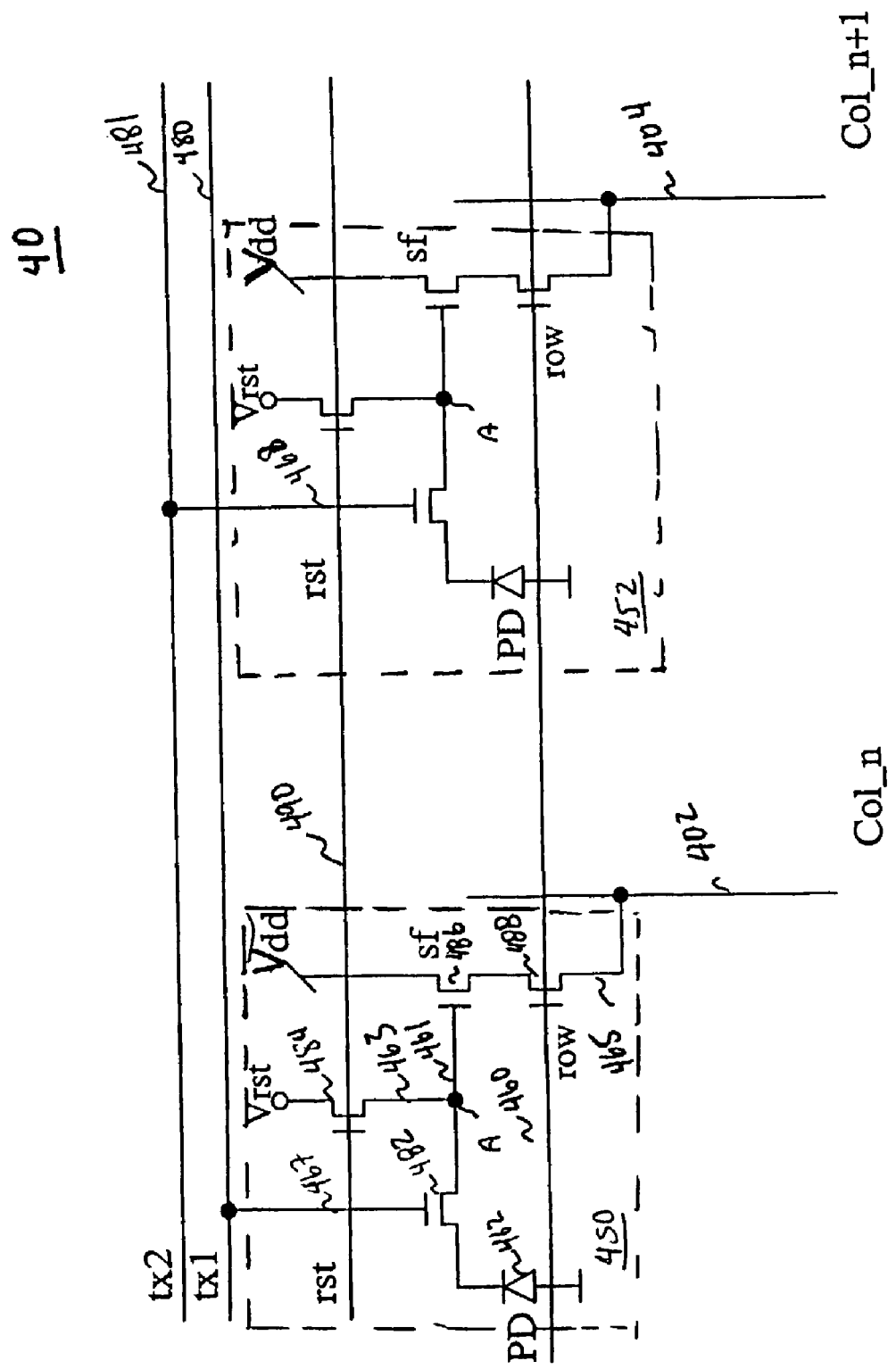
FIG. 5 is a differential readout pixel circuit in accordance with an exemplary embodiment of the invention.

FIG. 5 illustrates a desired and a reference pixel in accordance with the first exemplary embodiment of the invention. Assuming pixel 450 is the desired pixel—the pixel being read from—pixel 452 is the reference pixel located in the neighboring column of the same row. The significant difference between the circuit in FIG. 1 and the circuit in FIG. 5 is that an additional transfer gate control line 481 is provided. A pixel serving as a reference pixel is not a dummy pixel and serves as a desired pixel at a different time. Correspondingly, a pixel serving as a desired pixel at one time serves as a reference pixel at a different time. The control line 480 and the additional control line 481 are alternately coupled to the pixels in a row (e.g., control line 480 is coupled to all the pixels in the odd columns of the row and control line 481 is coupled to all the pixels in the even columns of the row) which allows control of the transfer gate transistor in the odd columns separate from the control of the transfer gate transistor in the even columns.

As indicated above, the common mode noise, including ground noise, during the reset phase for SHR, is Vcm1 and during the signal phase for SHS, is Vcm2. Therefore, if Vsig(n) is the signal voltage of column(n) and Vrst(n) is the reset voltage of column(n), then:

$$Vdiff(n)=(Vsig(n)+Vcm2)-(Vrst(n)+Vcm1) \quad (1)$$

Similarly, if Vsig(n+1) is the signal voltage of column (n+1) and Vrst(n+1) is the reset voltage of column(n+1), then:

$$Vdiff(n+1)=(Vsig(n+1)+Vcm2)-(Vrst(n+1)+Vcm1) \quad (2)$$

Using a differential readout circuit, in a manner commonly known in the art, and combining signals of the desired pixel and the reference pixel provides:

$$Vsig\_diff(n)=((Vsig(n)+Vcm2)-(Vrst(n)+Vcm1))- \\ ((Vsig(n+1)+Vcm2)-(Vrst(n+1)+Vcm1)) \quad (3)$$

However, if during the SHS phase of the reference pixel the transfer control gate is not enabled, therefore not permitting the charge on the photodiode to be coupled to the column line, then Vsig(n+1)=Vrst(n+1), e.g., the comparison signal value of the reference pixel is equivalent to the reset signal value of the reference pixel. Using the differential readout circuit described above for combining signals from the desired pixel and the reference pixel without enabling the transfer control gate during the SHS phase of the reference pixel removes common mode noise. That is, $$\begin{aligned} Vsig\_diff(n) &= ((Vsig(n) + Vcm2) - (Vrst(n) + Vcm1)) - \\ &\quad ((Vrst(n+1) + Vcm2) - (Vrst(n+1) + Vcm1)) \\ &= Vsig(n) - Vrst(n) \end{aligned} \quad (4)$$

for the desired pixel. In this manner, the Vsig and the Vrst of the desired pixel can be offset by the Vrst of the reference pixel to minimize noise while still providing the differential of the reset pixel signal Vrst(n) and photo signal Vsig(n) of the desired pixel.

Figure 6:
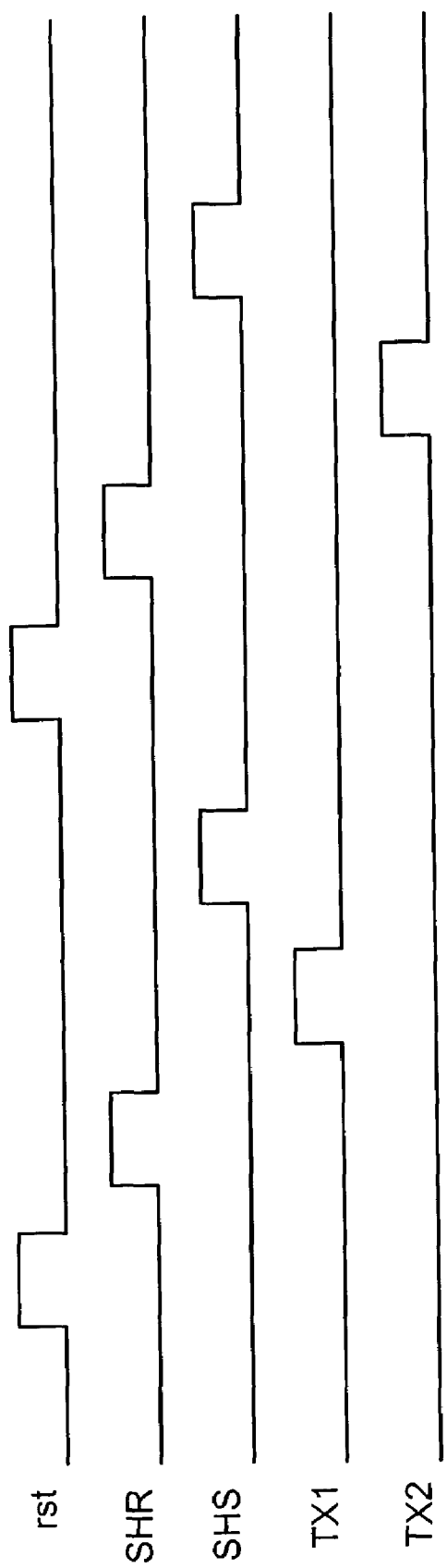
FIG. 6 is a simplified timing diagram associated with the circuitry of FIG. 5.

The operation of circuits of FIGS. 4 and 5 is now described with reference to the simplified signal timing diagram of FIG. 6. To read from desired pixel 450 the rst line 490 is enabled by a reset pulse after which it is disabled. Node A of desired pixel is reset by the reset voltage Vrst which is read out on line 402 by the SHR pulse applied to the row select transistor 488 and to the SHR switch of the readout circuit (Switch 410, FIG. 4). The reset voltage is sampled by a sample and hold circuit (FIG. 4) connected to the column line 402. Thus, Vrst of the desired pixel is sampled and stored on capacitor 418. After the reset voltage is stored, and after a charge integration period, the tx1 line 480 is enabled by a transfer pulse. The SHS switch of the readout circuit (switch 412, FIG. 4) is pulsed thereby storing an integrated charge pixel signal on capacitor 420. The reference pixel 452 is simultaneously read out. The steps to read out the reference pixel are similar with the exception that the transfer gate tx2 line 481 is not enabled, therefore isolating photo diode 162 and not transferring its charge to Node A. Thus, capacitor 414 connected to the reference pixel stores the reset signal of the reference pixel at the same time that the desired pixel stores the reset signal on capacitor 418 and capacitor 416 connected to the reference pixel stores the comparison signal of the reference pixel at the same time that the desired pixel stores the integrated charge signal on capacitor 420. The voltages stored in the sample and hold circuits for the odd and even columns are now available for the differential readout circuit to determine the Vsig_diff(n) in accordance with equation 4.

At a different time, pixel 452 is the desired pixel reading out the odd column pixel 452 and array operation is analogous to reading out even column pixel 450 with the difference that the transfer control line tx2 481 corresponding to pixel 452, tx2 line 481, would be enabled instead of the transfer control line tx1 480. The remaining signals in the FIG. 6 timing diagram describe the read out from pixel 452 as a desired pixel and pixel 450 as a reference pixel. Furthermore, when pixel 452 is the desired pixel, the reference pixel may be pixel 450 or it may be different pixel in the same row, but different column set (e.g., odd or even) than the desired pixel. Although FIG. 5 only discloses one odd column pixel 450 and even odd pixel 452, all the odd column pixels, and all the even column pixels, in the same row would be read out in the same manner. Other pixel array rows above and below the row containing pixels 450, 452 would also be read in the similar manner.

Figure 7:
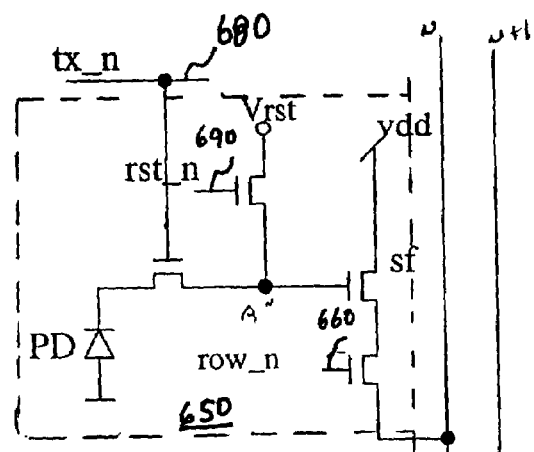
FIG. 7 is a differential readout pixel circuit in accordance with an another exemplary embodiment of the invention.
Figure 7:
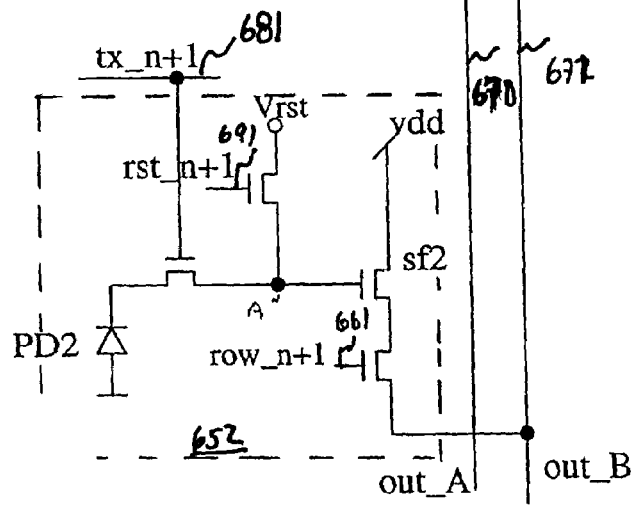

Turning to FIG. 7, a differential readout pixel circuit in accordance with an another exemplary embodiment of the invention is depicted. The FIG. 7 differential readout pixel circuit 60 differs from the differential readout pixel circuit 40 in FIG. 5 in that desired pixel is compared with a nearest neighbor in the same column, but in the next row, either in the row above or row below the row containing the desired pixel. Additionally, each column of pixels has two associated column lines with rows of pixels being alternately by row coupled to the column lines. As seen in FIG. 7, two column lines 670, 671 are used which permits read out of both pixels 650, 652 contemporaneously. Thus, pixel 650 is read out through column line 670 and pixel 652 is read out through column line 671. To effectuate a readout from pixels 650, 652, two different sets of respective controls lines are used: pixel 650, located in column n, has an associated transfer control line(n) 680, reset line(n) 690, and a row select line(n) 660. Pixel 652) located in adjacent column n+1, has an associated transfer control line(n+1) 681, reset line(n+1) 691, and a row select line(n+1) 661. A column sample and hold circuit is required for each of the column lines 678, 671 for storing both reset values and pixel charge integrated values of the desired pixel 650 and reference pixel 652.

Figure 8:
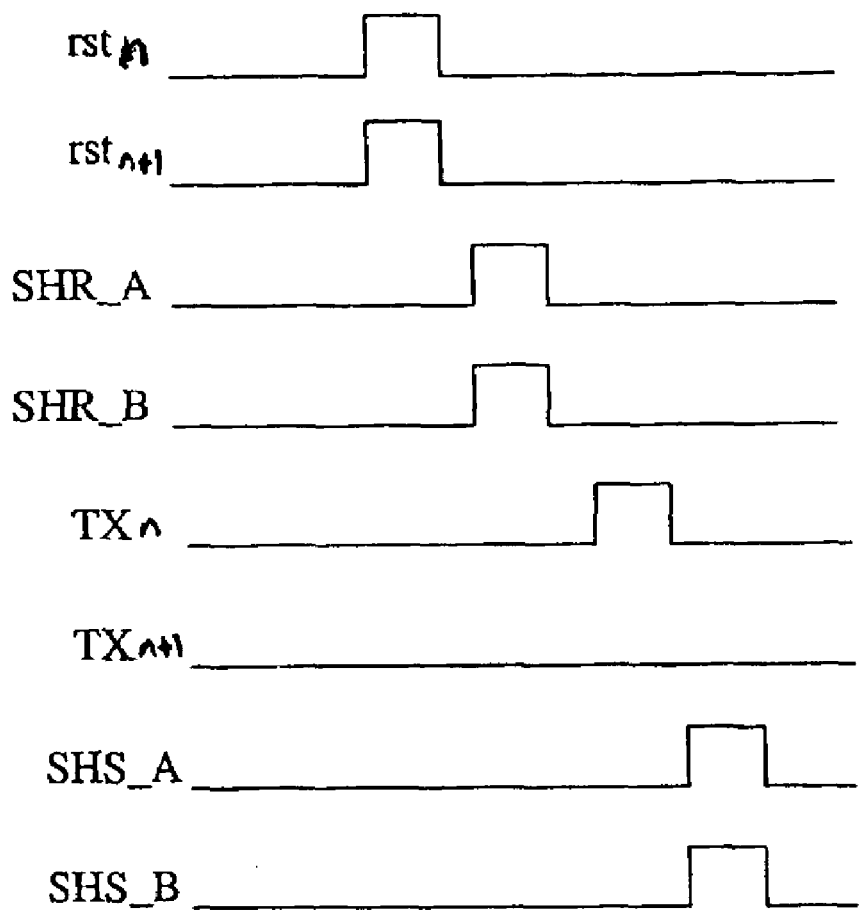
FIG. 8 is a simplified timing diagram associated with the circuitry of FIG. 7.

The operation of circuit of FIG. 7 is now described with reference to the simplified timing diagram for signal of FIG. 8. To read from desired pixel 650 and the reference pixel 652, the reset control lines 690, 691 are enabled by pulse signals Rstn, Rstn1 (FIG. 8). Then the SHR switches in the sample and hold circuits for both columns Rstn1 are enabled by signals SHR_A and SHR_B, thereby storing the reset voltages Vrst(n) and Vrst(n+1) for pixels 650, 652. The tx_n line 680 is then pulsed and the SHS switches in the sample and hold circuits are pulsed thereby storing pixel 650, 652 signals Vsig(n) and Vsig(n+1), where Vsig(n) is the charge integrated signal of the desired pixel 650 and Vsig(n+1) is the comparison signal of the reference pixel 652 and is equivalent to Vrst(n+1). The reset and charge accumulation signals of the desired pixel 650 and the reset and comparison signals of reference pixel 652 stored in the sample and hold circuits columns n, n+1 are now available for the differential readout circuit to determine Vsig_diff(n). At a different time the reference pixel 652 is read out as the desired pixel and another neighboring pixel, either a pixel above, for pixel 650, for example, or a pixel below, is used as the reference pixel. The steps to read out the reference pixel 652 as the desired pixel are similar to those described above when pixel 650 is the desired pixel.

Figure 9:
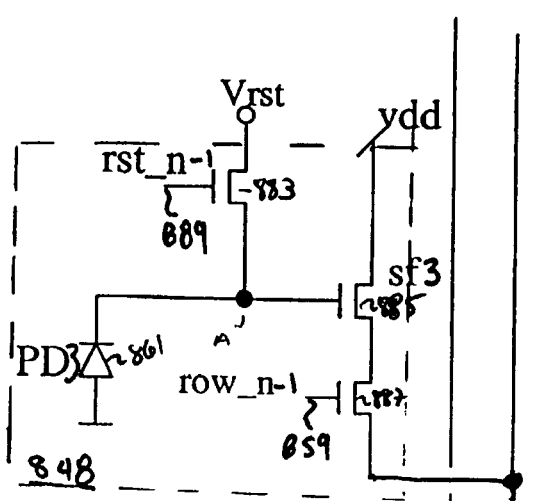
FIG. 9 is a differential readout pixel circuit in accordance with an another exemplary embodiment of the invention.
Figure 9:
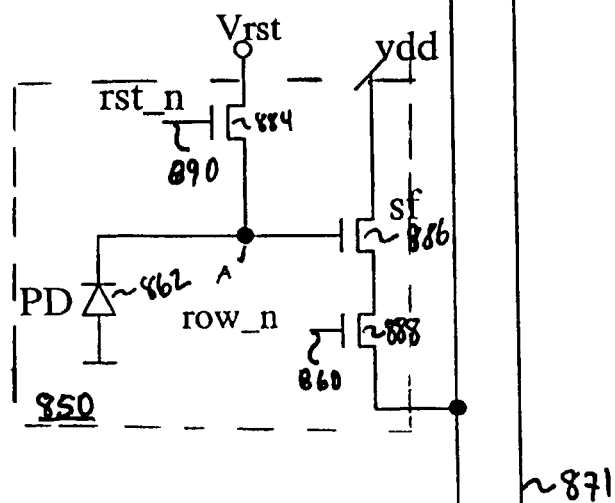
Figure 9:
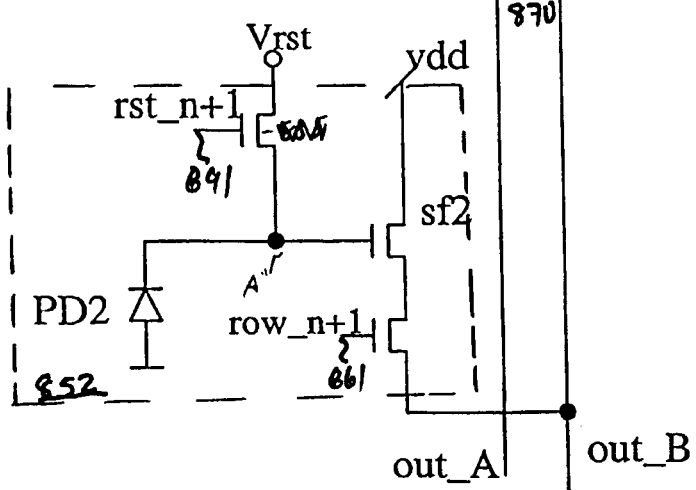

Turning to FIG. 9, a differential readout pixel circuit in accordance with an another exemplary embodiment of the invention is depicted. The FIG. 9 differential readout pixel circuit 80 differs from the differential readout pixel circuit 60 in FIG. 7 in that the pixels are 3T pixels instead of 4T pixels. As known in the art, a 3T pixel omits the transfer gate between the photodiode and a sensing node. Thus, the 3T pixel 850 has a photodiode 862, a reset gate 890, a source follower transistor 886, and a row select switch 888. The order of a read operation from a 3T pixel is different than from a 4T pixel. Without a transfer control gate to isolate the charge accumulated signal from the Node A in the 3T pixel, the charge accumulated signal is first sampled from the Node A and then subsequently the reset signal is sampled from the Node A. Therefore, a pixel is used as a reference pixel after it has been read out as a desired pixel (e.g., the photo integrated charge voltage and the reset charge have been read out). Thus, the pixel in the row behind, e.g., row n−1, serves as a reference pixel. Due to nonlinearity concerns, it is preferable to take a pixel from an already read row—the row behind—as the reference pixel.

Figure 10:
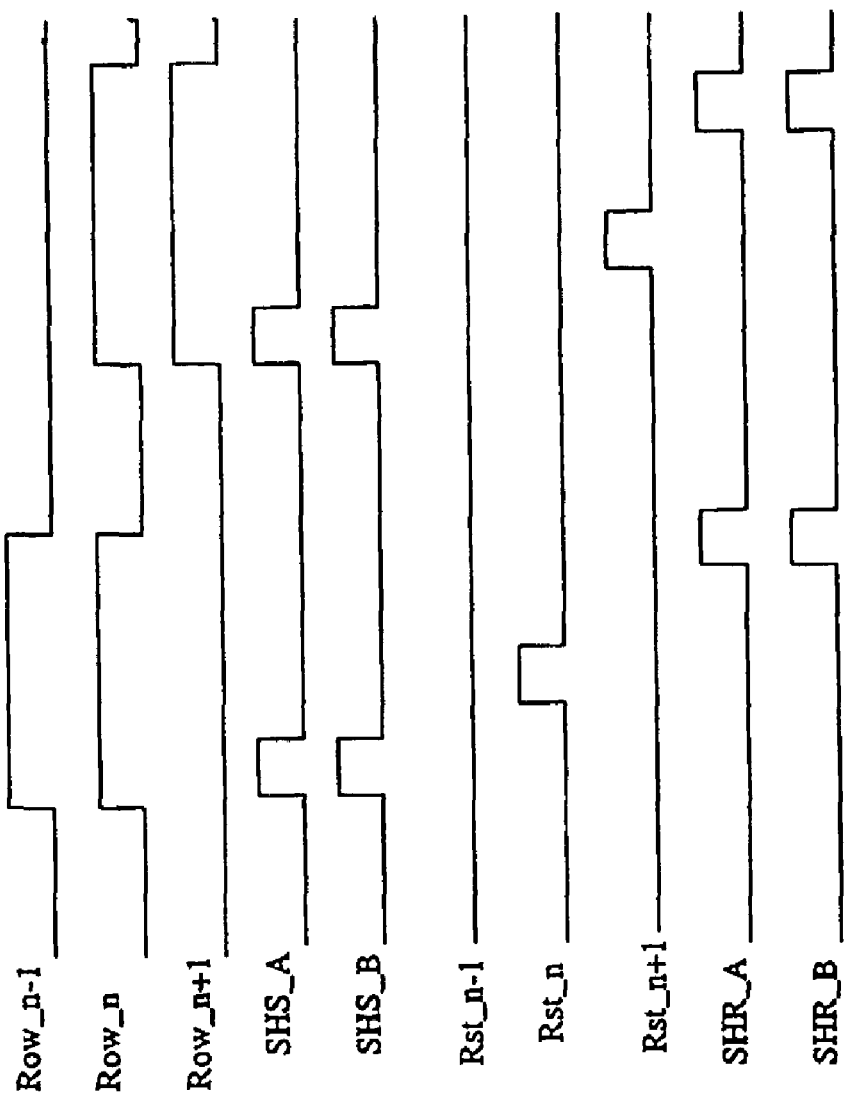
FIG. 10 is a simplified timing diagram associated with the circuitry of FIG. 9.

The operation of circuit of FIG. 9 is now described with reference to the simplified signal timing diagram of FIG. 10. To read from desired pixel 850 and the reference pixel 848, where pixel 848 has previously been readout as a desired pixel and not subsequently been reset since it has been readout, the row select lines 859, 860 are enabled by corresponding row select pulses. The comparison signal voltages are then sampled by the sample and hold circuits connected to column lines 870, 871. Thus, Vsig of the desired and reference pixel is stored. The reset line rst_n 890 of the desired pixel is pulsed after which it is disabled. The reset voltages are then sampled by the sample and hold circuits connected to column lines 870, 871. Thus, Vrst of the desired and reference pixel are stored. Row select lines 859, 860 are then disabled. The voltages stored in the sample and hold circuits for the two pixels are now available for the differential readout circuit to determine the Vsig_diff(n). The remaining signals in the FIG. 10 timing diagram describe the read out from pixel 852 as a desired pixel and pixel 850 as a reference pixel. In an alternative embodiment, the pixel in the row ahead is used as the reference pixel (e.g., pixel 852, instead of pixel 848, is the reference pixel to pixel 850).

Figure 11:
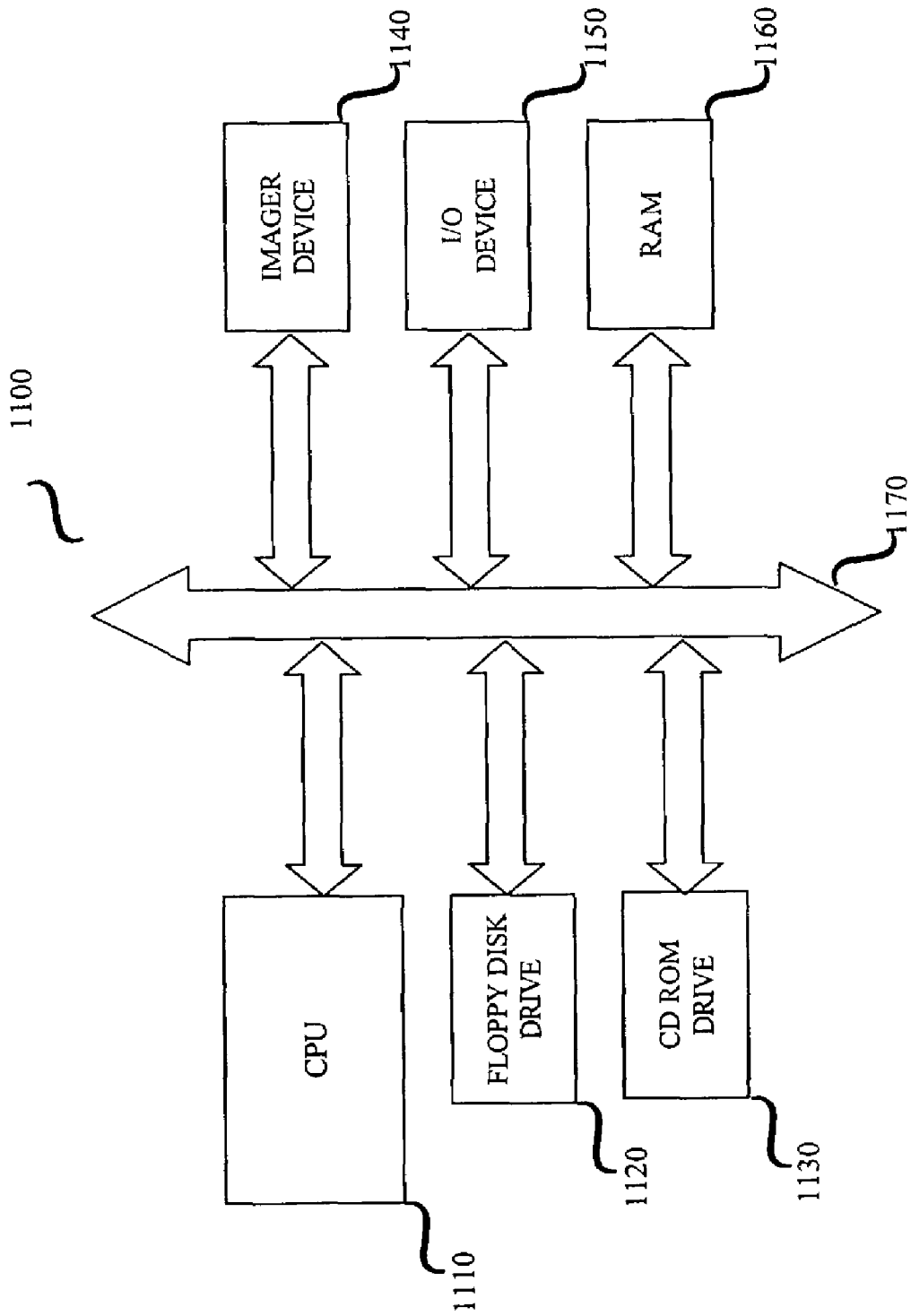
FIG. 11 is a block diagram representation of a processor-based system incorporating a CMOS imaging device in accordance with an exemplary embodiment of the invention.

The method and apparatus aspects of the invention are embodied in an image device 1140 shown in FIG. 11 which provides an image output signal. The image output signal can also be applied to a processor system 1100, also illustrated in FIG. 11. A processor based system, such as a computer system, for example, generally comprises a central processing unit (CPU) 1110, for example, a microprocessor, that communicates with one or more input/output (I/O) 1150 over a bus 1170. The CPU 1110 also exchanges data with random access memory (RAM) 1160 over bus 1170, typically through a memory controller. The processor system may also include peripheral devices such as a floppy disk drive 1120 and a compact disk (CD) ROM drive 1130 which also communicate with CPU 1110 over the bus 1170. Imager device 1140 is coupled to the processor system and includes a pixel imaging circuit as described along with respect to FIGS. 5, 7, and 9.

Figure 12:
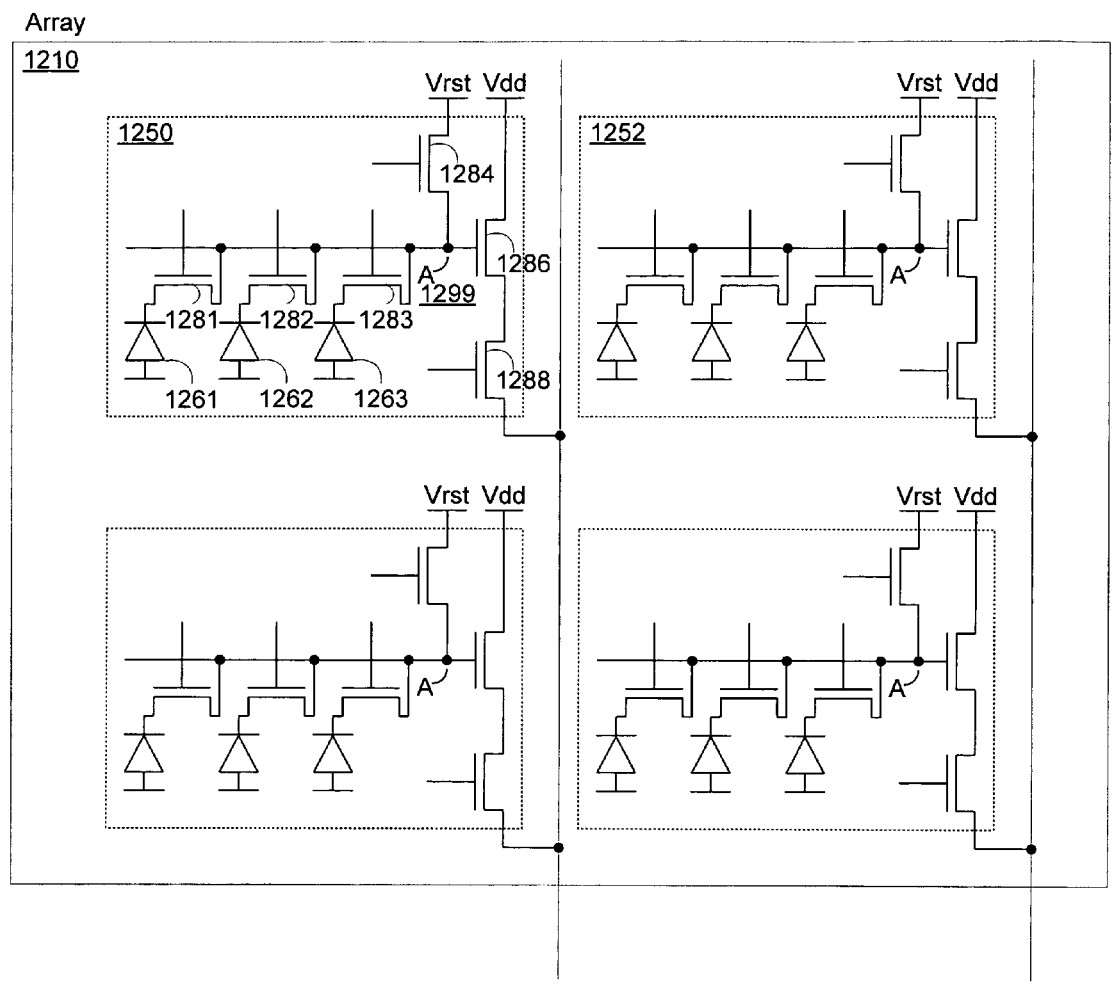
FIG. 12 is an exemplary embodiment of a pixel array having shared diffusion nodes.

Although the embodiments described utilize a desired and reference pixel, the invention is not so limited and the invention is also applicable to CMOS pixel arrays in which more than one photodiode from different pixels are switchably coupled to a floating diffusion node. Turning to FIG. 12 which depicts a pixel array having M times N circuits where each circuit has a shared floating diffusion node A 1299, a reset transistor 1284, a source follower transistor 1286, a row select transistor 1288, transfer transistors 1281, 1282, and 1283, and photodiodes 1261, 1262 and 1263. Circuit 1250 is similar in architecture to pixel 150 of FIG. 1, with a difference in that circuit 1250 has several photodiodes 1261, 1262, and 1263 switchably coupled through respective transfer transistors 1281, 1282, and 1283 to floating diffusion node A 1299. Although FIG. 12 is shown with two rows of two circuits each having three photo diodes, implementation of the array is not so limited.

Figure 1:
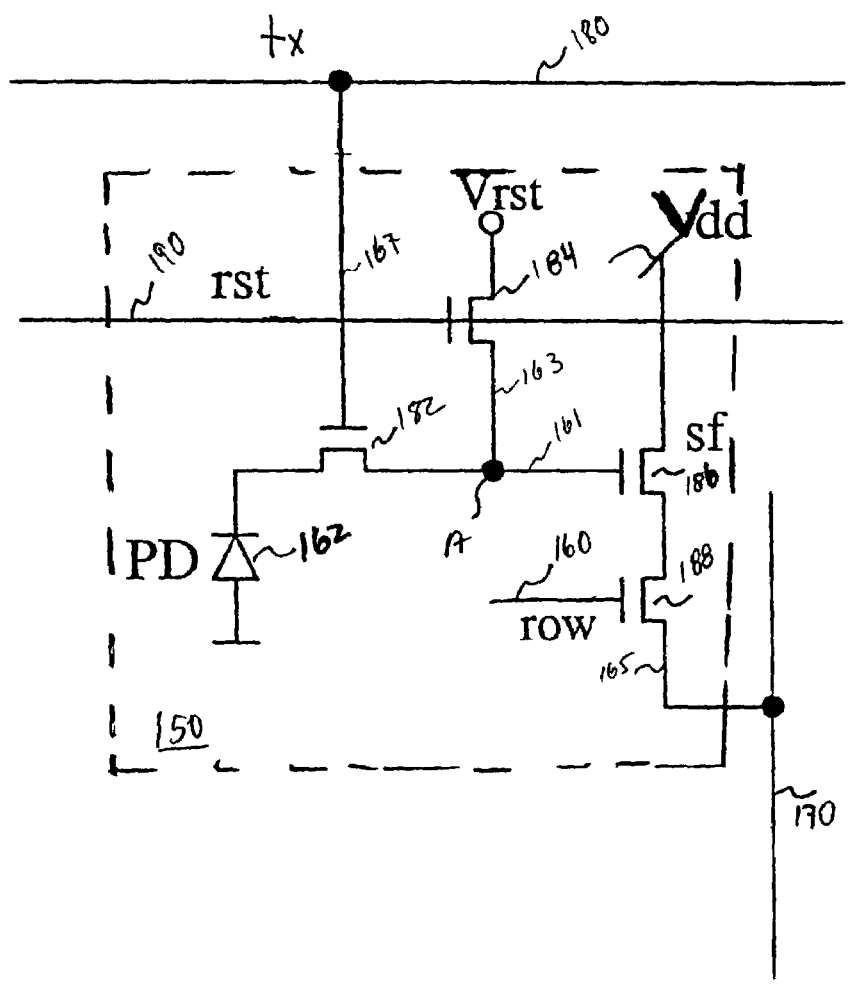
FIG. 1 is a prior art active pixel.
Figure 2:
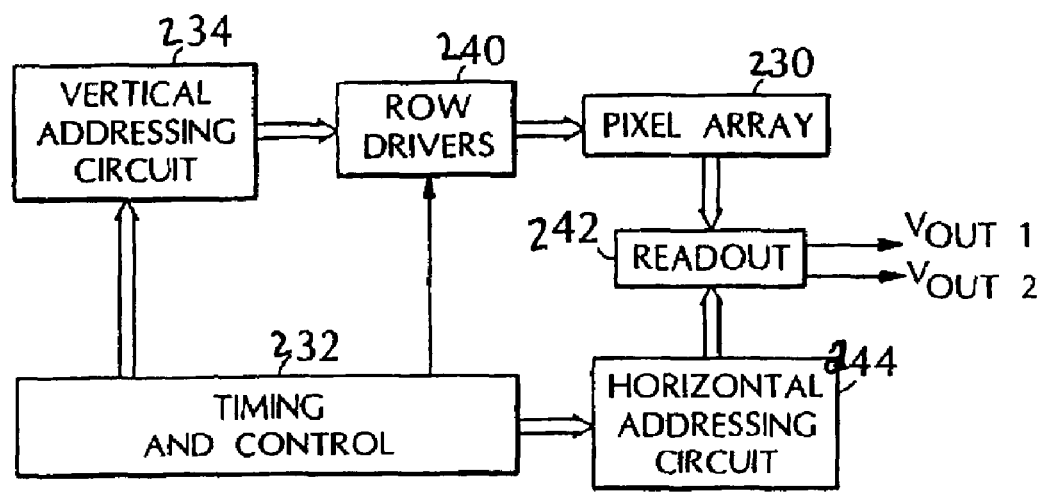
FIG. 2 is a block diagram of a prior art CMOS active sensor chip.
Figure 3:
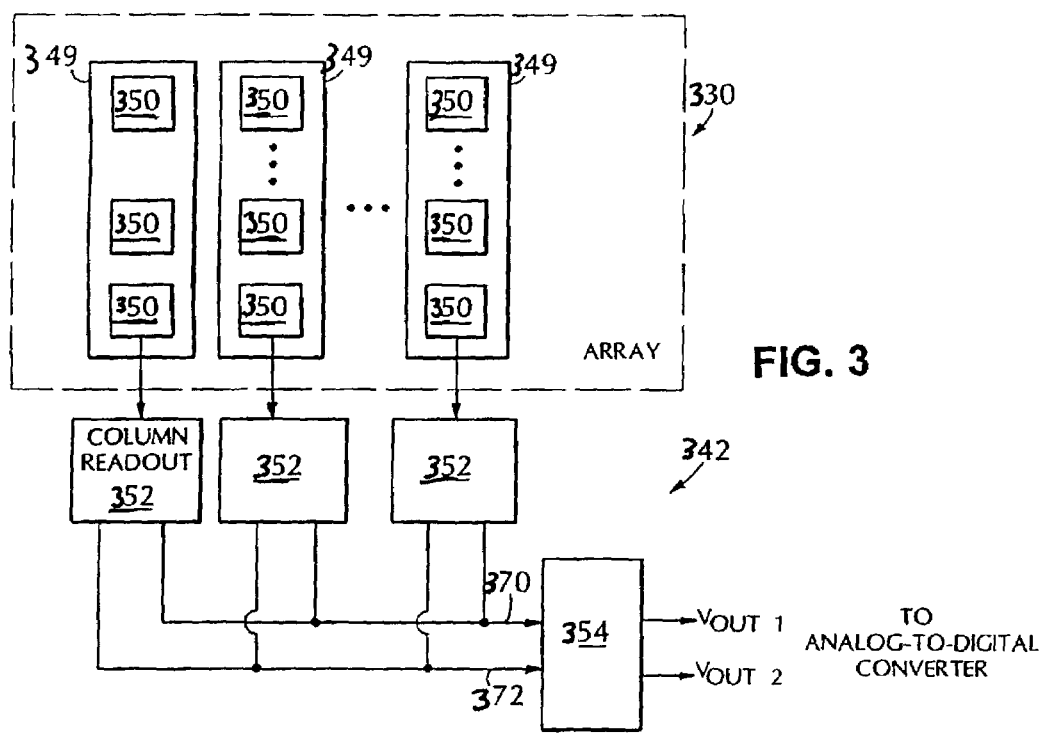
FIG. 3 is a block diagram of a prior art array of active pixels and an associated readout circuit.

A read out operation of circuit 1250 is similar to the read out operation of circuit 150 of FIG. 1 in that before the read out of the charge accumulated signal from each respective photodiode 1261, 1262, and 1263, a reset operation is performed by a reset signal being temporarily applied to reset transistor 1284.

A differential readout may be applied to the pixel array 1210 using an embodiment of the present invention, where circuit 1250 serves as a desired circuit and circuit 1252 serves as the reference circuit. For example, using a readout operation similar to that described above with respect to a differential readout of the pixels 450, 452 in FIG. 5, a differential read out of circuits 1250, 1252 is done. For example, a charge accumulated signal from photodiode 1261 of circuit 1250 and a reset signal from circuit 1250 is compared with a comparison signal and a reset signal from circuit 1252. Then a charge accumulated signal from photodiode 1262 of circuit 1250 and a reset signal from circuit 1250 is compared with a comparison signal and a reset signal from circuit 1252. After which, a charge accumulated signal from photodiode 1263 of circuit 1250 and a reset signal from circuit 1250 is compared with a comparison signal and a reset signal from circuit 1252. At a different time, circuit 1252 is the desired circuit and circuit 1250 serves as the reference circuit. Although the readout operation of FIG. 12 is described as sequentially reading out the photodiodes 1261, 1262, and 1263, the readout order can be altered. Furthermore, even though FIG. 12 is described with respect to a differential readout operation using the nearest neighboring circuit in the same row as the reference circuit, the invention is not so limited. Although FIG. 12 is describes circuits sharing a floating diffusion node, the invention is not so limited. For example, a circuit may share a single electrical component, e.g., a row select gate, a reset gate, a transfer gate, a diffusion node, a drain, a contact, etc., or a circuit may share a combination of electrical components.

While the invention has been described and illustrated with reference to specific exemplary embodiments, it should be understood that many modifications and substitutions can be made without departing from the spirit and scope of the invention. Although the embodiments discussed above describe specific numbers of transistors, photodiodes, conductive lines, etc., the present invention is not so limited. Additionally, although the embodiments disclose two signals being sampled from the reference circuit, e.g., reset and comparison, a single reference value can be taken and as both the comparison and reset value. Accordingly, the invention is not to be considered as limited by the foregoing description but is only limited by the scope of the claims.

What is claimed as new and desired to be protected by Letters Patent of the United States is:

1. A method of operating an imaging pixel array of an image sensor, said method comprising:
    sampling a reset and a charge accumulated signal from a desired pixel;
    sampling a reset and a comparison signal from a reference pixel, wherein said reference pixel is a desired pixel at a different time; and
    using said reset and comparison signals from said reference pixel to offset noise from said desired pixel
    wherein said reset signal from said desired pixel is sampled simultaneously with said reset signal of said reference pixel.

2. The method of claim 1, wherein said charge accumulated signal from said desired pixel is simultaneously sampled with said comparison signal of said reference pixel.

3. The method of claim 2, wherein said reference pixel is in a different column from said desired pixel.

4. The method of claim 3, wherein said reference pixel is in the same row as said desired pixel.

5. The method of claim 4, wherein said reference pixel is the nearest neighbor of said desired pixel.

6. The method of claim 4, wherein said sampling further comprises:
    enabling a reset voltage to charge a respective Node A of said desired and reference pixel;
    sampling said Node A of said desired pixel and storing as said reset signal of said desired pixel;
    sampling said Node A of said reference pixel and storing as said reset signal of said reference pixel;
    enabling a photodiode of said desired pixel to charge Node A of said desired pixel;
    sampling said Node A of said desired pixel and storing as said charge accumulated signal of said desired pixel; and
    sampling said Node A of said reference pixel and storing as said comparison signal of said reference pixel.

7. The method of claim 6, wherein said using further comprises:
    determining a differential signal using said reset signal and charge accumulated signal of said desired pixel and said reset signal and comparison signal of said reference pixel.

8. The method of claim 2, wherein said reference pixel is in a different row from said desired pixel.

9. The method of claim 8, wherein said reference pixel is in the same column as said desired pixel.

10. The method of claim 9, wherein said reference pixel is the nearest neighbor of said desired pixel.

11. The method of claim 9, wherein said sampling further comprises:
    enabling a reset voltage to charge a respective Node A of said desired and reference pixel;
    sampling said Node A of said desired pixel and storing as said reset signal of said desired pixel;
    sampling said Node A of said reference pixel and storing as said reset signal of said reference pixel;
    enabling a photodiode of said desired pixel to charge Node A of said desired pixel;
    sampling said Node A of said desired pixel and storing as said charge accumulated signal of said desired pixel; and
    sampling said Node A of said reference pixel and storing as said comparison signal of said reference pixel.

12. The method of claim 11, wherein said using further comprises:
    determining a differential signal using said reset signal and charge accumulated signal of said desired pixel and said reset signal and comparison signal of said reference pixel.

13. The method of claim 9, wherein said sampling further comprises:
    sampling said Node A of said desired pixel and storing as said charge accumulated signal of said desired pixel;
    sampling said Node A of said reference pixel and storing as said comparison signal of said reference pixel;
    enabling a reset voltage to charge a Node A of said desired pixel;
    sampling said Node A of said desired pixel and storing as said reset signal of said desired pixel; and
    sampling said Node A of said reference pixel and storing as said reset signal of said reference pixel.

14. The method of claim 13, wherein said using further comprises:
  determining a differential signal using said reset signal and charge accumulated signal of said desired pixel and said reset signal and comparison signal of said reference pixel.

15. A method of operating an imaging pixel array of an image sensor, said method comprising:
  sampling a reset and a charge accumulated signal from a desired circuit having a shared floating diffusion node;
  sampling a reset and a comparison signal from a reference circuit having a shared floating diffusion node, wherein said reference circuit is a desired circuit at a different time; and
  using said reset and comparison signals from said reference circuit to offset noise from said desired circuit,
  wherein said reset signal from said desired circuit is sampled simultaneously with said reset signal of said reference circuit.

16. The method of claim 15, wherein said charge accumulated signal from said desired circuit is simultaneously sampled with said comparison signal of said reference circuit.

17. The method of claim 16, wherein said reference circuit is in a different column from said desired circuit.

18. The method of claim 17, wherein said reference circuit is in the same row as said desired circuit.

19. The method of claim 18, wherein said reference circuit is the nearest neighbor of said desired circuit.

20. The method of claim 18, wherein said sampling further comprises:
  enabling a reset voltage to charge said respective shared floating diffusion node of said desired and reference circuit;
  sampling said shared floating diffusion node of said desired circuit and storing as said reset signal of said desired circuit;
  sampling said shared floating diffusion node of said reference circuit and storing as said reset signal of said reference circuit;
  enabling a photodiode of said desired circuit to charge shared floating diffusion node of said desired circuit;
  sampling said shared floating diffusion node of said desired circuit and storing as said charge accumulated signal of said desired circuit; and
  sampling said shared floating diffusion node of said reference circuit and storing as said comparison signal of said reference circuit.

21. The method of claim 20, wherein said using further comprises:
  determining a differential signal using said reset signal and charge accumulated signal of said desired circuit and said reset signal and comparison signal of said reference circuit.

22. The method of claim 16, wherein said reference circuit is in a different row from said desired circuit.

23. The method of claim 22, wherein said reference circuit is in the same column as said desired circuit.

24. The method of claim 23, wherein said reference circuit is the nearest neighbor of said desired circuit.

25. The method of claim 23, wherein said sampling further comprises:
  enabling a reset voltage to charge said respective shared floating diffusion node of said desired and reference circuit;
  sampling said shared floating diffusion node of said desired circuit and storing as said reset signal of said desired circuit;
  sampling said shared floating diffusion node of said reference circuit and storing as said reset signal of said reference circuit;
  enabling a photodiode of said desired circuit to charge shared floating diffusion node of said desired circuit;
  sampling said shared floating diffusion node of said desired circuit and storing as said charge accumulated signal of said desired circuit; and
  sampling said shared floating diffusion node of said reference circuit and storing as said comparison signal of said reference circuit.

26. The method of claim 25, wherein said using further comprises:
  determining a differential signal using said reset signal and charge accumulated signal of said desired circuit and said reset signal and comparison signal of said reference circuit.

27. The method of claim 23, wherein said sampling further comprises:
  sampling said shared floating diffusion node of said desired circuit and storing as said charge accumulated signal of said desired circuit;
  sampling said shared floating diffusion node of said reference circuit and storing as said comparison signal of said reference circuit;
  enabling a reset voltage to charge shared floating diffusion node of said desired circuit;
  sampling said shared floating diffusion node of said desired circuit and storing as said reset signal of said desired circuit; and
  sampling said shared floating diffusion node of said reference circuit and storing as said reset signal of said reference circuit.

28. The method of claim 27, wherein said using further comprises:
  determining a differential signal using said reset signal and charge accumulated signal of said desired circuit and said reset signal and comparison signal of said reference circuit.

29. An image sensor, comprising:
  a desired pixel for generating a reset and charge accumulation signal;
  a reference pixel for generating a reset signal and comparison signal, wherein said reference pixel is a desired pixel at a different time;
  a circuit for sampling and holding said reset and charge accumulated signals generated by said desired pixel and said reset and comparison signals generated by said reference pixel; and
  a combining circuit for generating an output based on combination of said reset and charge accumulated signals generated by said desired pixel and said reset and comparison signals generated by said reference pixel,
  wherein said circuit for sampling and holding is adapted to simultaneously sample and hold said reset signal of said desired pixel and said reset signal of said reference circuit, and simultaneously samples and holds said charge accumulated signal of said desired pixel and comparison signal of said reference circuit.

30. The sensor of claim 29, wherein said desired pixel is in a same column of said reference pixel.

31. The sensor of claim 30, wherein said desired pixel is the nearest neighbor of said reference pixel.

32. The sensor of claim 31, wherein said desired pixel is in the row below said reference pixel.

33. The sensor of claim 29, wherein said desired pixel is in a same row of said reference pixel.

34. The sensor of claim 33, wherein said desired pixel is the nearest neighbor of said reference pixel.

35. An image sensor, comprising:
a desired circuit having a shared floating diffusion node for generating a reset and charge accumulation signal;
a reference circuit having a shared floating diffusion node for generating a reset signal and comparison signal, wherein said reference circuit is a desired circuit at a different time;
a circuit for sampling and holding said reset and charge accumulated signals generated by said desired circuit and said reset and comparison signals generated by said reference circuit; and
a combining circuit for generating an output based on combination of said reset and charge accumulated signals generated by said desired circuit and said reset and comparison signals generated by said reference circuit,
wherein said circuit for sampling and holding is adapted to simultaneously sample and hold said reset signal of said desired circuit and said reset signal of said reference circuit, and simultaneously samples and holds said charge accumulated signal of said desired circuit and comparison signal of said reference circuit.

36. The sensor of claim 35, wherein said desired circuit is in a same column of said reference circuit.

37. The sensor of claim 36, wherein said desired circuit is the nearest neighbor of said reference circuit.

38. The sensor of claim 37, wherein said desired circuit is in the row below said reference circuit.

39. The sensor of claim 35, wherein said desired circuit is in a same row of said reference circuit.

40. The sensor of claim 39, wherein said desired circuit is the nearest neighbor of said reference circuit.

41. A circuit for sampling and holding signals from a desired and reference pixel, comprising:
a first sample and hold circuit to store a first and second signal from a desired pixel, said first circuit adapted to be coupled with a first column line; and
a second sample and hold circuit to store a third and fourth signal from a reference pixel, said second circuit adapted to be coupled with a second column line, wherein said reference pixel and said desired pixel are exposed at a substantially same time to a same image, wherein said reference pixel is a desired pixel at a different time.

42. The circuit of claim 41, where said first sample and hold circuit further comprises:
a sample and hold reset circuit to store a desired pixel reset signal as said first signal from said desired pixel; and
a sample and hold signal circuit to store a desired pixel charge integrated signal as said second signal from said desired pixel.

43. The circuit of claim 41, where said second sample and hold circuit further comprises:
a second sample and hold reset circuit to store a reference pixel reset signal as said third signal from said reference pixel; and
a second sample and hold signal circuit to store a reference pixel comparison signal as said fourth signal from said desired pixel.

44. The circuit of claim 43, wherein said first and second sample and hold circuits are adapted to simultaneously sample and hold said reset signals of said desired pixel and said reset signal of said reference circuit, and said first and second sample and hold circuits are adapted to simultaneously sample and hold said comparison signal of said reference circuit and said charge accumulated signal of said desired pixel.

45. The circuit of claim 43, where said first sample and hold circuit further comprises:
a differential amplifier circuit for generating a differential output of said first and second stored signal.

46. The circuit of claim 45, where said second sample and hold circuit further comprises:
a differential amplifier circuit for generating a differential output of said third and fourth stored signal.

47. A circuit for sampling and holding signals from a desired and reference circuit having a shared floating diffusion node, comprising:
a first sample and hold circuit to store a first and second signal from a desired circuit having a shared floating diffusion node, said first circuit adapted to be coupled with a first column line; and
a second sample and hold circuit to store a third and fourth signal from a reference circuit having a shared floating diffusion node, said second circuit adapted to be coupled with a second column line, wherein said reference circuit is a desired circuit at a different time,
where said second sample and hold circuit further comprises:
a second sample and hold reset circuit to store a reference circuit reset signal as said third signal from said reference circuit; and
a second sample and hold signal circuit to store a reference circuit comparison signal as said fourth signal from said desired circuit,
wherein said first and second sample and hold circuits are adapted to simultaneously sample and hold said reset signals of said desired circuit and said reset signal of said reference circuit, and said first and second sample and hold circuits are adapted to simultaneously sample and hold said comparison signal of said reference circuit and said charge accumulated signal of said desired circuit.

48. A semiconductor chip, comprising:
a pixel image sensor, comprising:
a desired pixel for generating a reset and charge accumulation signal;
a reference pixel for generating a reset signal and comparison signal, wherein said reference pixel is a desired pixel at a different time;
a circuit for sampling and holding said reset and charge accumulated signals generated by said desired pixel and said reset and comparison signals generated by said reference pixel; and
a combining circuit for generating an output based on combination of said reset and charge accumulated signals generated by said desired pixel and said reset and comparison signals generated by said reference pixel,
wherein said circuit for sampling and holding is adapted to simultaneously sample and hold said reset signal of said desired pixel and said reset signal of said reference circuit, and simultaneously samples and holds said charge accumulated signal of said desired pixel and comparison signal of said reference circuit.

49. The chip of claim 48, wherein said desired pixel is in a same column of said reference pixel.

50. The chip of claim 49, wherein said desired pixel is the nearest neighbor of said reference pixel.

51. The chip of claim 50, wherein said desired pixel is in the row below said reference pixel.

52. The chip of claim 48, wherein said desired pixel is in a same row of said reference pixel.

53. The chip of claim 52, wherein said desired pixel is the nearest neighbor of said reference pixel.

54. A processor system, comprising:
- a central processing unit;
- pixel image sensor coupled to said central processing unit, comprising;
- a desired pixel for generating a reset and charge accumulation signal;
- a reference pixel for generating a reset signal and comparison signal, wherein said reference pixel is a desired pixel at a different time;
- a circuit for sampling and holding said reset and charge accumulated signals generated by said desired pixel and said reset and comparison signals generated by said reference pixel; and
- a combining circuit for generating an output based on combination of said reset and charge accumulated signals generated by said desired pixel and said reset and comparison signals generated by said reference pixel,
wherein said circuit for sampling and holding is adapted to simultaneously sample and hold said reset signal of said desired pixel and said reset signals of said reference circuit, and simultaneously samples and holds said charge accumulated signal of said desired pixel and comparison signal of said reference circuit.

55. The system of claim 54, wherein said desired pixel is in a same column of said reference pixel.

56. The system of claim 55, wherein said desired pixel is the nearest neighbor of said reference pixel.

57. The system of claim 56, wherein said desired pixel is in the row below said reference pixel.

58. The system of claim 54, wherein said desired pixel is in a same row of said reference pixel.

59. The system of claim 58, wherein said desired pixel is the nearest neighbor of said reference pixel.

* * * * *

UNITED STATES PATENT AND TRADEMARK OFFICE
CERTIFICATE OF CORRECTION

PATENT NO. : 7,375,748 B2  Page 1 of 1
APPLICATION NO. : 10/230222
DATED : May 20, 2008
INVENTOR(S) : Krymski It is certified that error appears in the above-identified patent and that said Letters Patent is hereby corrected as shown below:

In column 9, line 61, in Claim 1, after "pixel" insert -- , --.

In column 15, line 14, in Claim 54, after "comprising" delete ";" and insert -- : --, therefor.

Signed and Sealed this

Twenty-sixth Day of August, 2008

JON W. DUDAS
*Director of the United States Patent and Trademark Office*